United States Patent [19]
Davis

[11] Patent Number: 5,678,849
[45] Date of Patent: Oct. 21, 1997

[54] THERMOPLASTIC AIR BAG COVER HAVING A DOMED FRONT PANEL AND MULTIFUNCTIONAL UNITARY SWITCHING MODULE

[75] Inventor: David J. Davis, Troy, Mich.

[73] Assignee: Larry J. Winget, Leonard, Mich.

[21] Appl. No.: 451,458

[22] Filed: May 26, 1995

[51] Int. Cl.⁶ .................................. B60R 21/16
[52] U.S. Cl. ........................ 280/728.3; 280/731
[58] Field of Search .................. 280/728.2, 728.3, 280/731

[56] References Cited

U.S. PATENT DOCUMENTS

| | | |
|---|---|---|
| 4,421,960 | 12/1983 | Arima et al. . |
| 4,604,912 | 8/1986 | Sugita et al. . |
| 4,720,610 | 1/1988 | MacHarrie . |
| 4,934,735 | 6/1990 | Embach ............... 280/731 |
| 5,002,306 | 3/1991 | Hiramitsu et al. . |
| 5,062,661 | 11/1991 | Winget ................ 280/731 |
| 5,085,461 | 2/1992 | Shibata ................ 280/731 |
| 5,085,462 | 2/1992 | Gualtier . |
| 5,294,147 | 3/1994 | Edge . |
| 5,303,952 | 4/1994 | Shermetaro et al. . |
| 5,369,232 | 11/1994 | Leonelli ............... 200/61.54 |
| 5,399,819 | 3/1995 | Lang et al. ........... 200/61.54 |
| 5,465,998 | 11/1995 | Davis . |
| 5,520,412 | 5/1996 | Davis ................. 280/728.3 |
| 5,542,694 | 8/1996 | Davis ................. 280/728.3 |
| 5,569,893 | 10/1996 | Seymore .............. 200/61.54 |
| 5,573,268 | 11/1996 | Leonelli .............. 280/731 |
| 5,590,902 | 1/1997 | Eckhout .............. 280/728.3 |

FOREIGN PATENT DOCUMENTS

| | | |
|---|---|---|
| 2200814 | 4/1974 | France . |
| 57-198140 | 4/1982 | Japan . |

Primary Examiner—Kenneth R Rice
Attorney, Agent, or Firm—Brooks & Kushman P.C.

[57] ABSTRACT

A thermoplastic air bag cover is provided having a plurality of domes formed on its front cover which enclose switches of at least one multifunctional unitary switching module. Preferably, a pair of unitary multifunctional switching modules are provided and corresponding raised domes in the front cover sealingly enclose and protect the switches thereof and also serve as switch activation mechanisms. In a separate embodiment of the invention, a coupling mechanism is provided for both mechanically and electrically coupling the first and second unitary switching modules together in order to facilitate assembly of the resulting air bag cover.

11 Claims, 3 Drawing Sheets

THERMOPLASTIC AIR BAG COVER HAVING A DOMED FRONT PANEL AND MULTIFUNCTIONAL UNITARY SWITCHING MODULE

CROSS-REFERENCE TO RELATED APPLICATIONS

This invention is related to U.S. patent application Ser. No. 08/407,925, filed Mar. 21, 1995, entitled "Air Bag Cover Having A Switch Assembly Disposed Therein" now U.S. Pat. No. 5,590,902. This invention is also related to U.S. patent application Ser. No. 08/458,882, filed Jun. 2, 1995, entitled "Thermoplastic Air Bag Cover Having A Membrane Switch" now U.S. Pat. No. 5,520,412. This invention further relates to U.S. patent application Ser. No. 08/451,452, filed May 26, 1995, entitled "Thermoplastic Air Bag Cover Having A Unitary Multifunctional Domed Switching Module" now U.S. Pat. No. 5,542,694.

1. Technical Field

This invention relates to plastic air bag covers having switch assemblies therein and, in particular, to such covers which are affixable to air bag containers.

2. Background Art

Presently, when air bag covers are provided in automobiles on the driver's side of the vehicle, the air bag is stored in the steering column behind an air bag cover. During automatic inflation of the air bag, the air bag cover moves away from the steering column to permit its safety function between the steering column and the operator of the vehicle.

A recent practice in the automotive industry is utilization of all plastic fabricated air bag covers. Conventional air bag covers used in conjunction with occupant restraint systems often include various connection systems for attaching the air bag cover to the uninflated air bag container.

The U.S. patent to Winget, U.S. Pat. No. 5,062,661, discloses a rigid plate attached to a substantially rigid remainder of a front panel of an air bag cover to define a hollow compartment which, together, move upon manual actuation of a flexible manually operable diaphragm at the front surface of the front panel. Upon separation from the side panel, the front panel, including the diaphragm, the hollow compartment, and a rigid plate move together to permit the inflating air bag to leave the cover. The front panel has a first electrically conductive inner surface for making a circuit path with a corresponding second electrically connected inner surface of the rigid plate.

It is desirable to have an air bag cover including a hidden membrane switch device which has multiple functions in addition to being a horn switch, such as controls for a radio, the climate control system, the cruise control system, a telephone, and the like.

The U.S. patent to Shermetaro et al., U.S. Pat. No. 5,303,952, discloses a horn switch device which is capable of performing multiple functions in addition to being a horn switch, such as controls for cruise control, radio controls, and the like. The U.S. patent to Hiramitsu et al., U.S. Pat. No. 5,002,306, discloses a plurality of membrane switches and a membrane switch group on the upper surface of the upper wall of a pad. The membrane switches may also be arranged at the inner surface of the upper wall, thereby hiding the switches. The membrane switch group comprises four membrane switches separate from the other membrane switches to control such items as auto-drive, air conditioning, a radio and a telephone, or the like.

U.S. Pat. No. 5,085,461 discloses control switches for an air conditioner and control switches for an audio device such as a radio. The switches project from the front surface of the air bag cover therethrough.

The U.S. patent to MacHarrie, U.S. Pat. No. 4,720,610, discloses a keyboard matrix switch including a membrane layer having dimples therein at each key switch site to provide tactile feel upon actuation. Each dimple is provided with a series of ribs formed in the membrane layer and which radiate outwardly from the dimple to preclude over-travel and locking of the dimple in an inverted position.

There are numerous problems associated with prior art air bag covers having switches incorporated therein. Consequently, it is desirable to provide an air bag cover having multifunctional switches incorporated therein which is simple, reliable, is economic to manufacture, easy to assemble and test as is necessary.

SUMMARY OF THE INVENTION

An object of the present invention is to provide an air bag cover having at least one unitary switching module incorporated therein which is relatively simple and reliable, economic to manufacture, and easily assembled and tested.

In carrying the above object and other objects of the present invention, a relatively flexible thermoplastic air bag cover is provided. The cover includes a front panel adapted to overlie an undeployed air bag. The front panel has a front outer surface and a rear inner surface and is separable along a prescribed tear pattern upon deployment of the air bag. The front panel has a first plurality of raised domes molded therein to define a first set of switch activation means. The cover also includes a first unitary switching module lying behind the rear inner surface in a first switch activation area of the front panel. The first unitary switching module is adapted to be electrically coupled to a first set of electrical accessories of a motor vehicle wherein the first unitary switching module includes a corresponding first plurality of switches aligned with and enclosed within their respective domes in the front panel. The cover also includes a first back plate secured to the rear inner surface of the front panel in containing relationship to the first unitary switching module and forming a first hollow compartment for the first unitary switching module in the first switch activation area. Each switch is activated by depression of its respective raised dome on the front outer surface of the front panel.

Preferably, the air bag cover further includes a second plurality of raised domes molded in the front panel defining a second set of switch activation means. Also, the cover preferably includes a second unitary switching module lying behind the rear inner surface in a second switch activation area on the front panel and which is adapted to be electrically coupled to a second set of electrical accessories of the motor vehicle. The second unitary switching module includes a corresponding second plurality of switches aligned and enclosed within their respective domes in the front panel. Still preferably, the cover further includes a second back plate secured to the inner surface of the front panel in containing relationship to the second unitary switching module to form a second hollow compartment for the second unitary switching module in the second switch activation area. Each switch of the second plurality of switches is activated by depression of its respective dome on the front outer surface of the front panel.

The above objects and other objects, features, and advantages of the present invention are readily apparent from the following detailed description of the best mode for carrying

3 out the invention when taken in connection with the accompanying drawings.

BEST MODE FOR CARRYING OUT THE INVENTION

Figure 1:
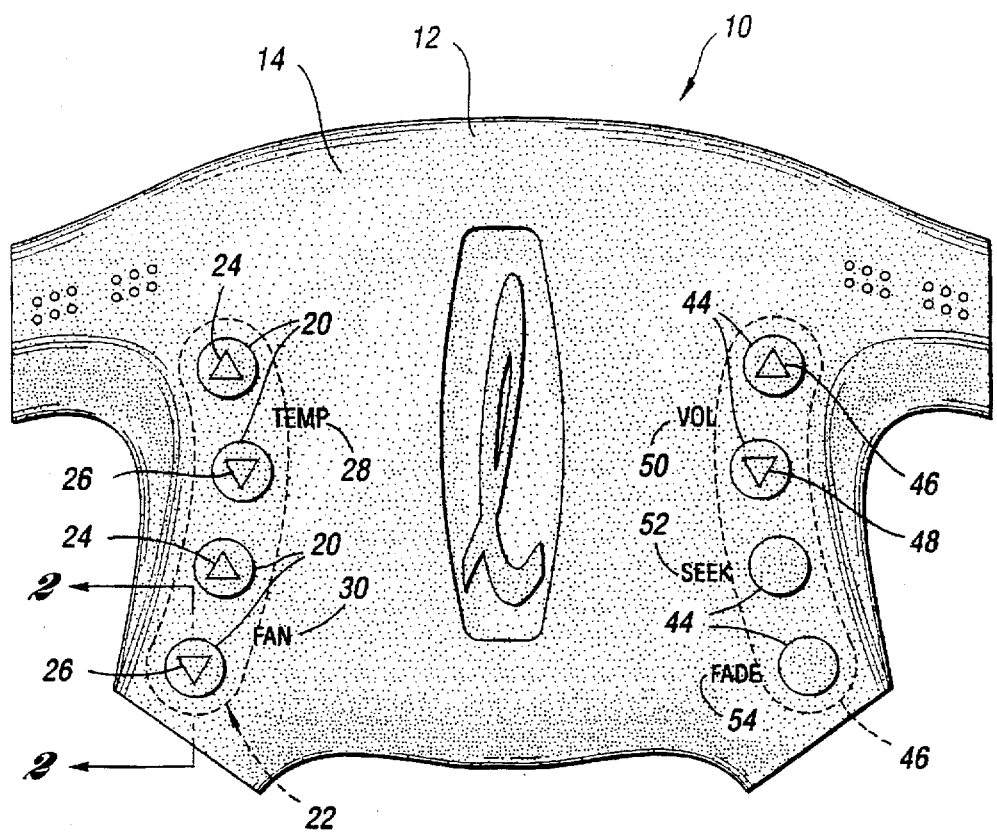
FIG. 1 is a front elevational view of an air bag cover constructed in accordance with the present invention.

Referring now to the drawing Figures, there is illustrated in FIGS. 1–6 various embodiments of an automotive air bag cover constructed in accordance with the present invention. Typically, an automotive air bag cover of the drawing Figures is adapted to be secured at the top end of the vehicle drive column (not shown) at the steering wheel of the vehicle.

Figure 2:
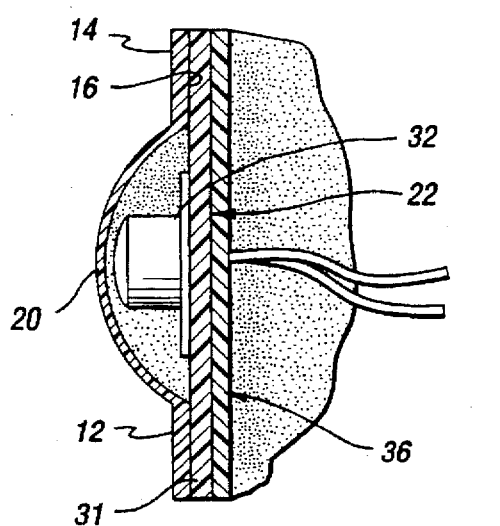
FIG. 2 is a sectional view taken of the air bag cover of FIG. 1 taken along lines 2—2 of FIG. 1.

The air bag cover of FIGS. 1 and 2 is generally indicated at 10. It is preferably a relatively flexible thermoplastic air bag cover formed by injection molding with a thermoplastic such as Santoprene® (trademark of Monsanto Company).

Figure 4:
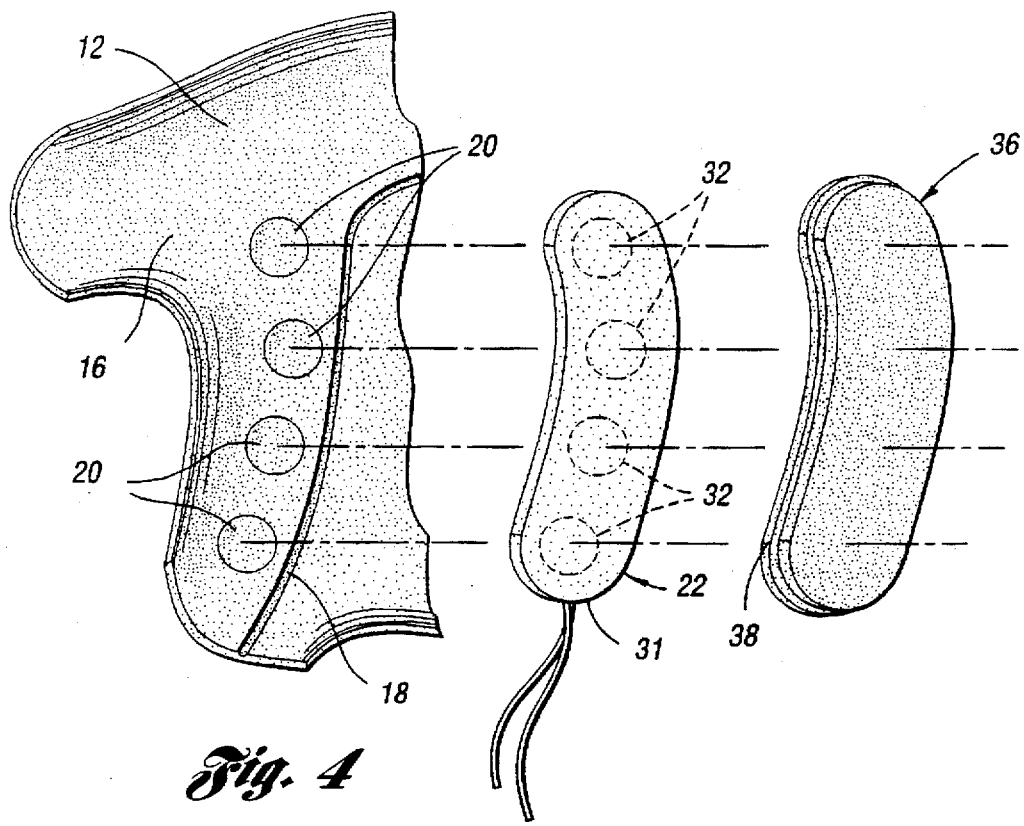
FIG. 4 is a rear exploded view partially broken away of the air bag cover of FIG. 1 illustrating one way of attaching a unitary switching module to the rear surface of the front panel.

The air bag cover 10 includes a front panel 12 overlying an undeployed air bag (not shown). A front panel 12 has a front outer surface 14 and a rear inner surface 16. The front panel 12 is separable on a prescribed tear pattern 18, as best shown in FIG. 4. The front panel 12 has a first plurality of raised domes 20 molded in a side portion of the front panel 12 which define a first set of switch activation mechanisms outside an area bordered by the tear pattern 18. Preferably, the raised domes are relatively thin and on the order of 1-2.2 millimeters in thickness.

Figure 5:
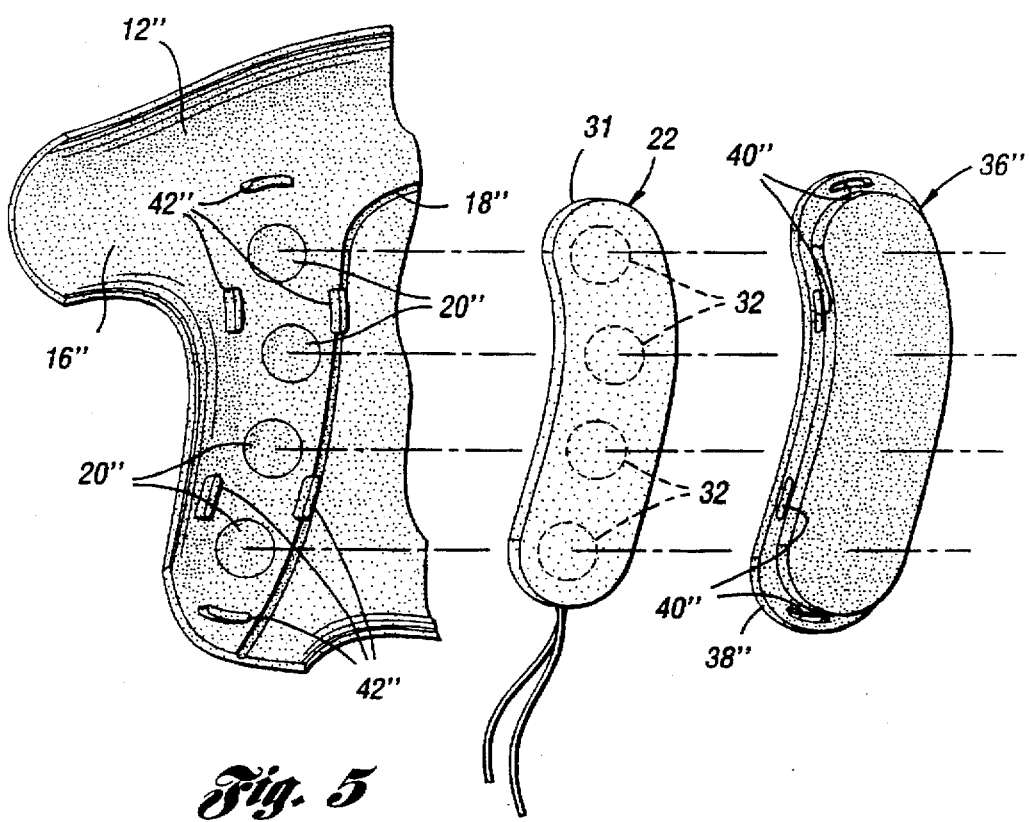
FIG. 5 is a view similar to the view of FIG. 4 illustrating a second way of attaching the unitary switching module to the rear surface of the front panel.

The cover 10 also includes a first unitary switching module, generally indicated at 22 in FIGS. 4 and 5, lying behind the rear inner surface 16 in a first switch activation area of the front panel 12. The switching module 22 has multiple functions as indicated by indicia in the form of up and down pointing triangles 24 and 26, respectively. Located adjacent thereto are indicia 28 and 30 formed on the front panel 12 which indicates the particular vehicle accessory to be controlled such as the automobile's climate control system including temperature control at 28 and circulating fan control at 30.

The first unitary switching module 22 may include a rigid insulative material such as an injection molded plastic with electrical circuitry having a metal stamping or the like embedded in the insulative material such as by insert molding. Alternatively, the electrical circuitry may comprise a thin electrically conductive leaf coated with a flexible electrically insulative coating such as a flexible plastic.

The switching module 22 also includes a plastic base plate 31 and a first plurality of switches such as a switch 32 as

Figure 3:
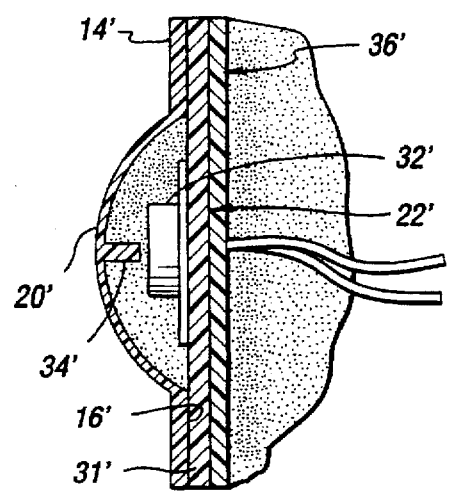
FIG. 3 is a view similar to the view of FIG. 2 illustrating a second embodiment of the air bag cover of the present invention.

4 illustrated in FIG. 2 or a switch 32' as illustrated in FIG. 3 mounted on the base plate 31. The switches may be any of a variety of known miniature switches such as dome switches, thin film switches such as force sensing resistors, piezoelectric elements, conductive inks, pressure-sensitive electrically conductive adhesives, and the like. The base plate 31 and the raised domes 30 form sealed hollow compartments for the switches 32.

The switch 32 illustrated in FIG. 2 is a dome switch. The switch of FIG. 3 is illustrated as a switch 32' which does not have a dome and which is activated by a plunger 34' integrally formed on the inner surface of its respective raised dome 20'. The plunger 34' is provided so that the raised dome 20' does not have to be pushed to any great extent in order to activate the switch 32', thereby preventing the raised dome 20' from being inverted. Parts illustrated in FIG. 3 which have the same or similar function and/or structure as the parts of FIG. 2 have the same reference numeral but a single prime designation.

Referring now to FIGS. 4 and 5, there are illustrated first and second embodiments of a first back plate, generally indicated at 36 and 36", respectively. The back plates 36 and 36" are secured to the rear inner surfaces 16 and 16" of the front panel 12 and 12", respectively, in containing relationship to the first unitary switching module 22 to form a first hollow compartment for the switching module 22 in the switch activation area of the front panel 12 and 12", respectively.

With respect to FIG. 4, the plastic back plate 36 preferably includes a rim or attachment portion 38 which is secured by being thermally bonded to the rear inner surface 16 of the front panel 12.

With respect to FIG. 5, the plastic back plate 36" includes a rim or attachment portion 38" including a corresponding plurality of apertures 40" formed therethrough for receiving and retaining a like plurality of rearwardly extending stakes 42" formed on the rear inner surface 16" of the front panel 12".

Referring now to the right-hand portion of FIG. 1, there is illustrated a second plurality of raised domes 44 also integrally molded in the front panel 12 and which define a second set of switch activation mechanisms. A second unitary switching module, illustrated in phantom at 46, is substantially identical to the first unitary switching module 22 and lies behind the rear inner surface 16 in a second switch activation area of the front panel 12. The switching module 46 includes a second plastic base plate (not shown) on which a second plurality of switches (not shown) are also mounted. The second base plate and the raised domes 44 form sealed hollow compartments for the second plurality of switches. The position of the raised domes 20, as well as the positions of the raised domes 44 on the front panel 12 may vary depending on the styling and ergonomics of the cover 10. Also, the switching modules 22 and 36 can be obtained from the Bergquist Company of Edina, Minn.

The second unitary switching module 46 is adapted to be electrically coupled to a second set of electrical accessories of the motor vehicle such as the radio by wires (not shown). Indicia such as an upwardly pointing arrow or triangle 46 indicates that depression of its raised dome increases the volume of a radio whereas indicia such as a downwardly pointing triangle 48 indicates that depression of its raised dome lowers the volume of the radio. Indicia 50 spelling out "Vol." on the front outer surface 14 indicates a particular function (i.e., volume control) for the radio of the vehicle.

In like fashion, the two lowermost domes 44 on the right-hand side of FIG. 1 control the seek and fade functions of the radio as indicated by indicia 52 and 54, respectively, formed in the front outer surface 14 of front cover 12.

In like fashion, other vehicle accessories may also be controlled such as a cruise control system, a telephone, and the like.

In the same fashion as the first unitary switching module 22, the second unitary switching module 46 is contained by a second back plate substantially identical to either of the back plates 36 or 36" which are respectively secured to the inner surfaces 16 or 16" of the front panel 12 or 12" in containing relationship to form a second hollow compartment for the switching module 46 in the second switch activation area. The second switching module 46 likewise includes a second plurality of switches activated by depression of its respective raised dome 44 on the front outer surface 14 of the front panel 12.

Figure 6:
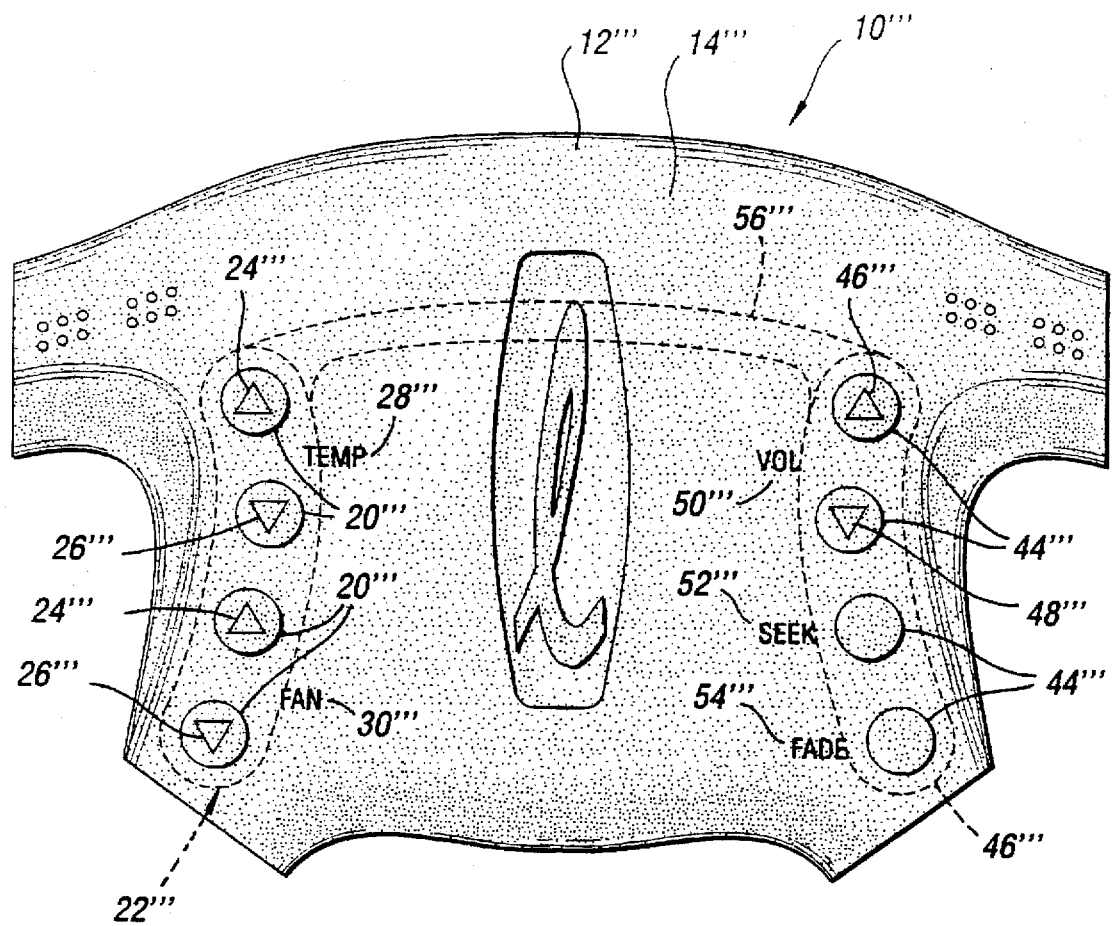
FIG. 6 is a front elevational view of another embodiment of the air bag cover constructed in accordance with the present invention.

Referring now to FIG. 6, there is illustrated yet another embodiment of an air bag cover 10''' constructed in accordance with the present invention. Parts illustrated in FIG. 6 which have the same or similar structure and/or function as the parts of FIGS. 1, 2 and 4 have a triple prime designation and the same reference numeral.

The air bag cover 10''' is substantially identical to the air bag cover 10 except a means or mechanism 56''' is provided for coupling the first and second unitary switching modules 22''' and 46''' together to form a U-shaped structure. Such a mechanism 56''' typically includes an electrically conductive member or surface electrically coupling the first and second switching modules 22''' and 46''', respectively, together with a plastic back plate integrally formed with the back plates of the modules 22''' and 46''' and secured to the inner surface of the front panel 12''' in the same fashion as either the back plate 36 is secured to the inner surface 16 of the front panel 12 or the back plate 36" is secured to the inner surface 16" of the front panel 12" (i.e., FIGS. 4 and 5, respectively). In this way, fewer parts are needed to manufacture the air bag cover 10''' of the present invention.

While the best mode for carrying out the invention has been described in detail, those familiar with the art to which this invention relates will recognize various alternative designs and embodiments for practicing the invention as defined by the following claims.

What is claimed is:

1. A relatively flexible thermoplastic air bag cover comprising:

a front panel adapted to overlie an undeployed air bag, the front panel having a front outer surface and a rear inner surface and being separable along a prescribed tear pattern upon deployment of the air bag, the front panel having a first plurality of raised domes molded therein to define a first set of switch activation means;

a first unitary switching module lying behind the rear inner surface in a first switch activation area of the front panel and adapted to be electrically coupled to a first set of electrical accessories of a motor vehicle, wherein the first unitary switching module includes a corresponding first plurality of switches aligned and enclosed within their respective domes in the front panel; and a first back plate secured to the rear inner surface of the front panel in containing relationship to the first unitary switching module and forming a first hollow compartment for the first unitary switching module in the first switch activation area, wherein each switch is activated by depression of its respective front dome on the front outer surface of the front panel.

2. The air bag cover as claimed in claim 1 further comprising a plurality of rearwardly extending stakes formed on the rear inner surface of the front panel wherein the back plate has an attachment portion including a corresponding plurality of apertures formed therethrough for receiving and retaining the stakes therein.

3. The air bag cover as claimed in claim 1 wherein at least one of the raised domes includes an integrally formed plunger extending toward its respective switch.

4. The air bag cover as claimed in claim 1 further comprising:

a second plurality of raised domes molded in the front panel defining a second set of switch activation means;

a second unitary switching module lying behind the rear inner surface in a second switch activation area of the front panel and adapted to be electrically coupled to a second set of electrical accessories of the motor vehicle wherein the second unitary switching module includes a corresponding second plurality of switches aligned and enclosed within their respective raised domes in the front panel; and a second back plate secured to the inner surface of the front panel in containing relationship to the second unitary switching module and forming a second hollow compartment for the second unitary switching module in the second switch activation area, wherein each switch of the second plurality of switches is activated by depression of its respective raised dome on the front outer surface of the front panel.

5. The air bag cover as claimed in claim 4 further comprising means for coupling the first and second unitary switching modules together to form a U-shaped structure.

6. The air bag cover as claimed in claim 4 further comprising means for electrically coupling the first and second switching modules together.

7. The air bag cover as claimed in claim 1 wherein at least one of the raised domes includes first visually perceptible indicia formed on an outer surface thereof related to one of the first set of electrical accessories.

8. The air bag cover as claimed in claim 7 wherein the front panel includes second visually perceptible indicia formed on the outer surface thereof adjacent the first visually perceptible indicia to identify the one of the first set of electrical accessories, the switch enclosed within the at least one of the raised domes controlling the one of the first set of electrical accessories.

9. The air bag cover as claimed in claim 4 further comprising means for coupling the first and second back plates together.

10. The air bag cover as claimed in claim 1 wherein the first unitary switching module includes a first base plate on which the first plurality of switches are mounted and wherein the first base plate and the first plurality of raised domes form a first set of sealed hollow compartments for the first plurality of switches.

11. The air bag cover as claimed in claim 4 wherein the second unitary switching module includes a second base plate on which the second plurality of switches are mounted and wherein the second base plate and the second plurality of raised domes form a second set of sealed hollow compartments for the second plurality of switches.

* * * * *